W. STELZER

Sept. 8, 1931. ELASTICALLY MOUNTED SELF ADJUSTING AIRFOIL Re. 18,181

Original Filed July 13, 1928

Inventor:
William Stelzer

Reissued Sept. 8, 1931

Re. 18,181

UNITED STATES PATENT OFFICE

WILLIAM STELZER, OF CHICAGO, ILLINOIS, ASSIGNOR TO BENDIX AVIATION CORPORATION, OF NEW YORK, N. Y., A CORPORATION OF DELAWARE

ELASTICALLY MOUNTED SELF ADJUSTING AIRFOIL

Original No. 1,725,222, dated August 20, 1929, Serial No. 292,358, filed July 13, 1928. Application for reissue filed August 22, 1930. Serial No. 477,152.

The invention relates to improvements in the mounting of airfoils on the fuselage of variable kinds of aircraft; and the objects of the improvement are, first, to provide elastic intermediate members between the carrying plane and the fuselage to make the latter independent of the shocks imposed on the wings by fluctuating air, second to impart to the wings an inherent self-adjusting action to keep the lifting force constant during flight through turbulent air. This is attained by hinging the wings to the fuselage by means of joists projecting forwardly from the wings, whereby the angle of attack increases when the airfoil swings downward and decreases when the latter swings upward.

Another object is attained by providing a retarding damper to check the vibration of the airfoil.

It is well known that carrying planes in oscillating air or during flying through wind billows are subjected to sudden changes in lift thus causing a dangerous strain on the wing structures, and making travelling very uncomfortable. Especially in trans-Atlantic flights, where air sinks were experienced, some of which may have been the cause of disasters of heavily loaded planes, it will be of great advantage to have means for absorbing the above-mentioned shocks, thus making flying independent of the weather, and when flying through wind billows the automatic adjustment of the angle of attack will prevent sudden dropping of the airplane.

An airplane equipped with my invention will be able to alight on a rough field because the shocks incurred will be counteracted by the increased lift and drag acting on the carrying plane which swings downward during a shock, thereby opposing the tendency to tilt over.

Other objects will appear in the following detailed description and the accompanying drawings wherein.

Figure 1:
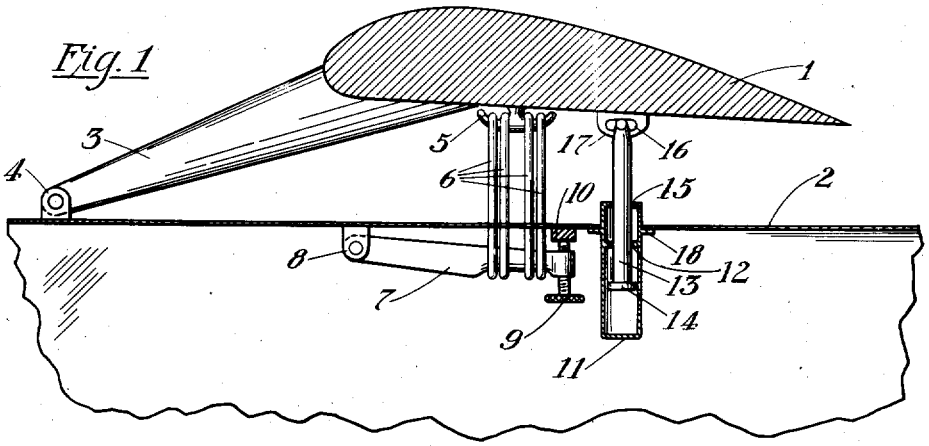
Fig. 1 is a vertical section on the longitudinal axis of the airplane equipped with my invention.
Figure 2:
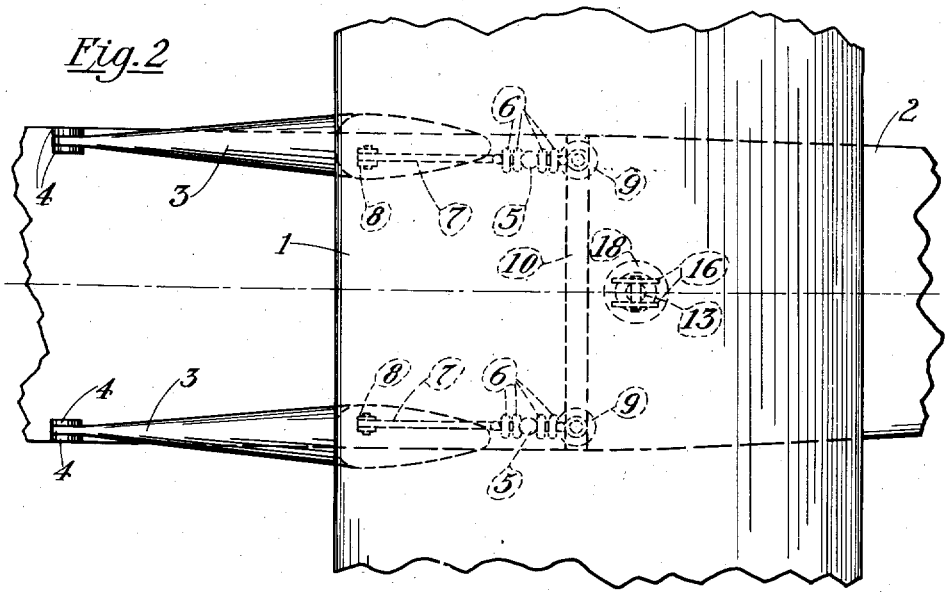
Fig. 2 is a top plan view of the middle portion of said airplane.

The terms employed herein are used in the generic and descriptive sense and therefore are not intended primarily as terms of limitation.

The wing 1 is pivotally connected to the fuselage 2 by means of the joists 3 which are rigidly conjoined with the trussing system of the wing 1, their terminations forming eye ends which are pivotally held in the jaw hinges 4 formed on or secured to the fuselage 2. The double arm hood 5 is fixed to the wing 1 and receives the elastic strands 6 associated with the fuselage 2 by means of the lever 7 pivoted to the upper portion of the fuselage 2 by a jaw hinge 8. The other end of the lever 7 forms a boss drilled and tapped to receive a thumb screw 9 for adjustment of the tension of the strands 6, to compensate, for instance, for fuel consumption or other changes in weight. The force exerted by the strands 6 is transmitted to the fuselage 2 and particularly to its longérons by the transverse strut 10 or any other suitable member of the fuselage, that shown on the drawings forming no part of the present invention.

The oscillation of the air always tends to influence an airfoil during flight and if the airfoil is supported freely, a resonance effect occurs causing the excursions of the airfoil in the vertical direction to build up, imposing jerks and dangerous impulsive loads on the airfoil. This is eliminated in my invention by providing a retarding damper which absorbs all vibrations without disturbing the excursions of the airfoil that are concurrent with the fluctuations of the wind. 11 constitutes the cylinder of the damper and is rigidly secured to the fuselage 2 by the flange 18. The plunger 13 at its lower end 14 is adapted to slide in the cylinder 11, and is also guided at 15, the upper end 16 having the shape of a T whose arms are held in the slotted lugs 17 secured to the airfoil 1. The cylinder 11 may be half filled with oil or any other suitable retarding medium which has to pass through the small space between the cylinder wall and the head 14 when the latter is moving up or down, thereby damping the motion of the plunger and the elements connected therewith.

The excursions of the wing from its normal position are limited, upward, by the stop 12, and downward, by the bottom of the cylinder 11, by stopping the head 14 of the plunger 13.

The damper as shown on the drawings may be of any standard kind and the details shown are only illustrative and form no part of the present invention.

The operation of the invention will be briefly stated:

The strands 6 are rigged so, that the airfoil, when in undisturbed flight through quiescent air, attains an angle of attack that is known to be most economical. Now suppose a sudden upward current is encountered. The increased lift presses the airfoil upward until it attains the angle of attack where the tension of the elastic strands balances the lift, therefore the angle of wing setting and consequently the drag component are now smaller. The result is that the force of upward currents augments both lift and thrust instantly without imposing any disturbing shocks on the airplane.

If the airfoil is projected through air sinks, it is prevented from sudden dropping, because the strands contract as the lifting force decreases, thereby the airfoil attains a steeper angle of attack and the lift is compensated.

In the embodiment shown herein, rubber strands of the kind used for shock absorbers on landing gears are employed to obtain a feathering action between the wing and the fuselage; however, any other elastic medium may be used, such as steel or pneumatic springs.

It may readily be seen by inspection of the drawings that the drag of the airfoil produces a torque about the pivotal axis in cooperation with the elastic strands 6. This torque is dependent on the distance between the pivots 4 and the center of pressure of the airfoil and also on the distance perpendicular to the line of traction between the pivots 4 and the line where the drag acts. By shortening the joists 3 so that the center of pressure of the airfoil is a short distance aft the pivots 4 and by maintaining the elevation of the airfoil above the same pivots 4, the torque becomes sufficient to keep the airfoil at the desired pitch so that the springs 6 may be dispensed with.

However, in the preferred embodiment of my invention, I have selected a combination of the two described principles, whereby the pitching moment necessary to maintain the desired angle of incidence is effected by both the elastic strands and the torque due to the drag. This arrangement permits the airfoil to make excursions upward and downward when flying through erratic wind and makes the whole system very elastic, especially when landing and alighting.

The embodiment of my invention shown in this application pertains only to one type of aircraft and may be changed for other types without departing from the broad scope of the invention.

Further embodiments, modifications and variations may be resorted to within the spirit and scope of the invention as here claimed.

I claim:

1. In an airplane, in combination, a fuselage, an airfoil, means for connecting said airfoil to a transverse pivotal axis that is in fixed relation to the fuselage and substantially in advance of the airfoil, elastic means associating with the fuselage and the said airfoil and tending to increase the angle of incidence of the latter, means for adjustment of the tension of the elastic members, and a damper interposed between the fuselage and the airfoil to prevent vibration of the latter.

2. In an airplane, in combination, a fuselage, an airfoil, means for connectiong said airfoil to a transverse pivotal axis that is in advance of and below the said airfoil, elastic means associating with the airfoil and the fuselage, said elastic means opposing the weight of the latter and tending to increase the angle of incidence of the said airfoil, means for adjustment of the tension of the elastic members, and means for retarding the excursions of the airfoil from the normal position to prevent vibration.

3. In an airplane, in combination, a fuselage, an airfoil above said fuselage, and means for pivotally connecting the airfoil directly to the fuselage at a point forwardly of the leading edge of the airfoil.

4. In an airplane having a fuselage, a wing, means for connecting said wing for bodily movement with respect to the fuselage, and means normally tending to increase the angle of incidence of said wing.

5. In an airplane having a fuselage, a wing, means for connecting said wing for bodily movement in a vertical plane with respect to the fuselage, and means normally tending to increase the angle of incidence of said wing.

6. In combination with a fuselage, an airfoil, and means for pivotally mounting said airfoil with respect to the fuselage, said means being arranged forwardly of the leading edge of the airfoil and normally below the horizontal plane including the airfoil.

7. In an airplane, in combination, a fuselage, an airfoil, means located substantially forward of the center of pressure of said airfoil for pivotally connecting the latter with the fuselage, and damping means connecting the airfoil rearwardly of the center of pressure thereof, with the fuselage.

8. In an airplane, in combination, a fuselage, an airfoil, means for pivotally connecting the airfoil to the fuselage at a point forwardly of the leading edge of the airfoil, and damping means interconnecting said airfoil and fuselage.

9. In combination, an airplane body, a wing disposed transversely of said body, means for connecting said wing forwardly of the leading edge thereof to said body for bodily movement in a vertical plane with respect to the latter, and means for yieldably retarding such bodily movement.

10. In combination, an airplane body, a transverse wing, means for connecting the body forwardly of the leading edge of the wing to the latter adjacent the leading edge for bodily movement, and damping means associated with the wing and body, said means including means for positively limiting the bodily movement of the wing.

In testimony whereof I have signed this specification.

WILLIAM STELZER.